(12) United States Patent
Fujita

(10) Patent No.: US 12,391,804 B2
(45) Date of Patent: Aug. 19, 2025

(54) (POLY)THIOPHENE-(POLY)SILOXANE BLOCK COPOLYMER AND PRODUCTION METHOD THEREOF

(71) Applicant: Shin-Etsu Chemical Co., Ltd., Tokyo (JP)

(72) Inventor: Shoji Fujita, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 532 days.

(21) Appl. No.: 17/915,589

(22) PCT Filed: Mar. 11, 2021

(86) PCT No.: PCT/JP2021/009714
§ 371 (c)(1),
(2) Date: Sep. 29, 2022

(87) PCT Pub. No.: WO2021/215134
PCT Pub. Date: Oct. 28, 2021

(65) Prior Publication Data
US 2023/0125340 A1     Apr. 27, 2023

(30) Foreign Application Priority Data

Apr. 21, 2020   (JP) ................................. 2020-075174

(51) Int. Cl.
| | | |
|---|---|---|
| C08G 77/42 | (2006.01) | |
| C08G 61/12 | (2006.01) | |
| C08G 77/08 | (2006.01) | |
| C09D 165/00 | (2006.01) | |
| C09D 183/10 | (2006.01) | |

(52) U.S. Cl.
CPC ........... *C08G 77/42* (2013.01); *C08G 61/126* (2013.01); *C08G 77/08* (2013.01); *C09D 165/00* (2013.01); *C09D 183/10* (2013.01)

(58) Field of Classification Search
CPC ....... C08G 77/12; C08G 77/42; C08G 61/126
See application file for complete search history.

(56) References Cited

U.S. PATENT DOCUMENTS

| | | | |
|---|---|---|---|
| 6,235,861 B1 | 5/2001 | Kishi | |
| 7,279,534 B2 | 10/2007 | Luebben et al. | |
| 2005/0215760 A1 * | 9/2005 | Kirchmeyer | C08G 61/10 528/373 |
| 2006/0118901 A1 | 6/2006 | Williams et al. | |
| 2007/0224151 A1 | 9/2007 | Mougin et al. | |
| 2013/0126836 A1 * | 5/2013 | Mei | C08G 77/42 556/454 |
| 2014/0213809 A1 | 7/2014 | Kusunoki et al. | |

FOREIGN PATENT DOCUMENTS

| | | |
|---|---|---|
| JP | 2000-328042 A | 11/2000 |
| JP | 2014-34658 A | 2/2014 |
| JP | 2014-167091 A | 9/2014 |
| JP | 2016-128538 A | 7/2016 |
| WO | WO 98/28366 A1 | 7/1998 |
| WO | WO 2016/111225 A1 | 7/2016 |

OTHER PUBLICATIONS

"Synthesis and Characteriztion of Poly(3-hexylthiophene)-block-poly(dimethylsiloxane) for Photovoltaic Application" authored by Tsuchiya et al. and published in Polymer (2016) 92, 125-32.*
"Bulk Dispersion of Single-Walled Carbon Nanotubes in Silicones using Diblock Copolymers"authored by Chadwick et al. and published in the Journal of Polymer Science, Part A: Polymer Chemistry (2015) 53, 265-273.*
International Search Report (PCT/ISA/210), issued in PCT/JP2021/009714, dated May 25, 2021.
Li et al., "Synthesis and Properties of Polymers Containing Silphenylene Moiety via Catalytic Cross-Dehydrocoupling Polymerization of 1,4-Bis(dimethylsilyl)benzene", Macromolecules, 1999, vol. 32, No. 26, pp. 8768-8773.
Merker et al., "Preparation and Properties of Poly( tetramethyl-p-Silphenylene-Siloxane)", Journal of Polymer Science: Part A, 1964, vol. 2, pp. 15-29.

(Continued)

*Primary Examiner* — Marc S Zimmer
(74) *Attorney, Agent, or Firm* — Birch, Stewart, Kolasch & Birch, LLP

(57) ABSTRACT

Provided are a (poly)thiophene-(poly)siloxane block copolymer and a production method of a (poly)arylene-(poly)siloxane block copolymer, where the production method is capable of employing raw materials that are readily accessible, produces no metal salt as a by-product, and brings about a high conversion rate. The (poly)thiophene-(poly)siloxane block copolymer contains a structure represented by the following formula (1):

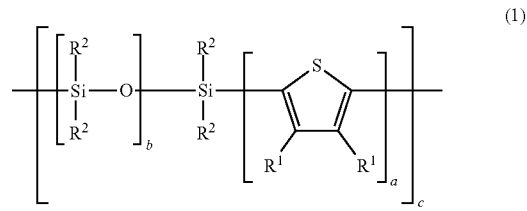

wherein each $R^1$ independently represents a hydrogen atom, a halogen atom, a hydroxy group, a hydrocarbon group having 1 to 20 carbon atoms, or an alkoxy group having 1 to 10 carbon atoms, and a bond may be formed between two $R^1$s; each $R^2$ independently represents a hydrocarbon group having 1 to 20 carbon atoms; a is a number of 1 to 1,000; b is a number of 2 to 2,000; c is a number of 1 to 1,000.

7 Claims, No Drawings

(56) References Cited

OTHER PUBLICATIONS

Rubinsztajn et al., "A New Polycondensation Process for the Preparation of Polysiloxane Copolymers", Macromolecules, 2005, vol. 38, pp. 1061-1063.
Written Opinion of the International Searching Authority (PCT/ISA/237), issued in PCT/JP2021/009714, dated May 25, 2021.
Extended European Search Report for European Application No. 21792398.6, dated May 16, 2024.

* cited by examiner

(POLY)THIOPHENE-(POLY)SILOXANE BLOCK COPOLYMER AND PRODUCTION METHOD THEREOF

TECHNICAL FIELD

The present invention relates to a (poly)thiophene-(poly)siloxane block copolymer and a production method thereof.

BACKGROUND ART

It is known that by introducing an aromatic ring into an organopolysiloxane main chain, a characteristic property (ies) owing to the aromatic ring will be expressed. For example, poly(tetramethyl-1,4-silphenylenesiloxane) is superior to polydimethylsiloxane in heat resistance and mechanical properties.

As a typical method for synthesizing the above (poly)arylene-(poly)siloxane block copolymer, there is known a method where bis(dimethylsilyl)arylene is at first synthesized from an aromatic dihalogen compound and chlorodimethyl silane via the Grignard reaction, followed by performing hydrolysis and polycondensation to obtain a (poly)arylene-(poly)siloxane block copolymer (see Non-patent document 1). Further, reports have also been made on, for example, a method where a (poly)arylene-(poly)siloxane block copolymer is obtained from bis(dimethylsilyl)arylene via a cross-dehydrogenation reaction using a palladium catalyst (see Non-patent document 2); and a method where a (poly)arylene-(poly)siloxane block copolymer is obtained from bis(dimethylsilyl)arylene and bis(dimethoxysilyl)arylene via a cross-demethanization reaction using a tris(pentafluorophenyl)borane catalyst (see Non-patent document 3).

Polythiophene is known as an electrically conductive polymer, and various applications utilizing for example the conductive property and antistatic performance thereof are put into consideration. However, there has never been a report on a (poly)arylene-(poly)siloxane block copolymer having a thiophene skeleton as an aromatic ring.

Since the known method(s) for synthesizing a (poly)arylene-(poly)siloxane block copolymer includes a step of synthesizing bis(dimethylsilyl)arylene via the Grignard reaction, there are production problems such as a problem that a large amount of a metal salt will be produced as a by-product, and a problem that a scope of application of raw materials is limited. Particularly, in terms of utilizing a thiophene compound as an arylene unit of the (poly)arylene-(poly)siloxane block copolymer, the above synthesis method has for example a problem that a thiophene skeleton-containing (poly)arylene-(poly)siloxane block copolymer cannot be synthesized; a method for utilizing a thiophene compound as the arylene unit of the (poly)arylene-(poly)siloxane block copolymer has not yet been put into practical use.

PRIOR ART DOCUMENTS

Non-Patent Documents

Non-patent document 1: R. L. Merker, M. J. Scott, Journal of Polymer Science Part A, 1964, 2, 15
Non-patent document 2: Y. Li, Y. Kawakami, Macromolecules, 1999, 32, 8768
Non-patent document 3: S. Rubinsztain, J. A. Cella Macromolecules, 2005, 38, 1061

SUMMARY OF THE INVENTION

Problems to be Solved by the Invention

Thus, it is an object of the present invention to provide a (poly)thiophene-(poly)siloxane block copolymer, and a production method thereof that is capable of solving the aforementioned problems.

Means to Solve the Problems

The inventor of the present invention diligently conducted a series of studies to solve the above problems, and completed the invention as follows. That is, the inventor found that by utilizing an iridium complex and a hydrogen acceptor, a (poly)thiophene-(poly)siloxane block copolymer can be directly and efficiently synthesized via an oxidative coupling reaction between a thiophene compound and a hydrosilyl group-containing organopolysiloxane without producing a metal salt as a by-product.

That is, the present invention is to provide the following (poly)thiophene-(poly)siloxane block copolymer and a production method thereof.

[1]
A (poly)thiophene-(poly)siloxane block copolymer containing a structure represented by the following formula (1):

[Chemical formula 1]

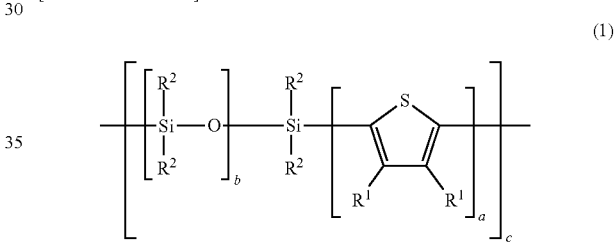

wherein each $R^1$ independently represents a hydrogen atom, a halogen atom, a hydroxy group, a hydrocarbon group having 1 to 20 carbon atoms, or an alkoxy group having 1 to 10 carbon atoms, and a bond may be formed between two $R^1$s; each $R^2$ independently represents a hydrocarbon group having 1 to 20 carbon atoms; a is a number of 1 to 1,000; b is a number of 2 to 2,000; c is a number of 1 to 1,000.

[2]
The (poly)thiophene-(poly)siloxane block copolymer according to [1], wherein the (poly)thiophene-(poly)siloxane block copolymer is represented by the following formula (2):

[Chemical formula 2]

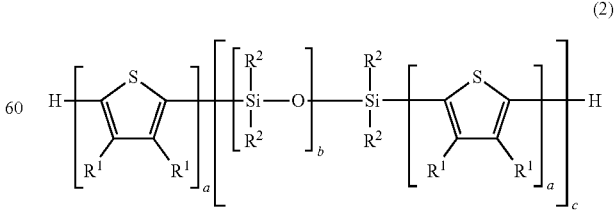

wherein each $R^1$ independently represents a hydrogen atom, a halogen atom, a hydroxy group, a hydrocarbon group having 1 to 20 carbon atoms, or an alkoxy group having 1 to 10 carbon atoms, and a bond may be formed between two $R^1$s; each $R^2$ independently represents a hydrocarbon group having 1 to 20 carbon atoms; each a is independently a number of 1 to 1,000; b is a number of 2 to 2,000; c is a number of 1 to 1,000.

[3]
The (poly)thiophene-(poly)siloxane block copolymer according to [1] or [2], wherein each $R^1$ independently represents a hydrogen atom, a chlorine atom, a bromine atom, an alkyl group having 1 to 12 carbon atoms, an aryl group having 6 to 12 carbon atoms, or an alkoxy group having 1 to 3 carbon atoms, and a bond may be formed between two $R^1$s.

[4]
A method for producing the (poly)thiophene-(poly)siloxane block copolymer according to any one of [1] to [3], including a step of reacting
(A) a thiophene compound represented by the following formula (3) and
(B) a hydrosilyl group-containing organopolysiloxane represented by the following formula (4) under the presence of an iridium complex and a hydrogen acceptor,

[Chemical formulae 3]

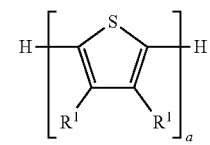

(3)

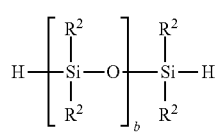

(4)

wherein each $R^1$ independently represents a hydrogen atom, a halogen atom, a hydroxy group, a hydrocarbon group having 1 to 20 carbon atoms, or an alkoxy group having 1 to 10 carbon atoms, and a bond may be formed between two $R^1$s; each $R^2$ independently represents a hydrocarbon group having 1 to 20 carbon atoms; a is a number of 1 to 1,000; b is a number of 2 to 2,000.

[5]
The method for producing the (poly)thiophene-(poly)siloxane block copolymer according to [4], wherein the iridium complex is a complex whose ligand is at least one compound selected from the group consisting of an aromatic hydrocarbon compound having 6 to 30 carbon atoms; a hetero ring compound having 2 to 30 carbon atoms; a hydrocarbon compound having a nitrogen-containing functional group, and having 1 to 30 carbon atoms; a hydrocarbon compound having an oxygen-containing functional group, and having 1 to 30 carbon atoms; a hydrocarbon compound having a sulfur-containing functional group, and having 1 to 30 carbon atoms; and a hydrocarbon compound having a phosphorus-containing functional group, and having 1 to 30 carbon atoms.

[6]
The method for producing the (poly)thiophene-(poly)siloxane block copolymer according to [5], wherein the iridium complex is a complex whose ligand is a hetero ring compound having 2 to 30 carbon atoms; or a hydrocarbon compound having a phosphorus-containing functional group, and having 1 to 30 carbon atoms.

[7]
The method for producing the (poly)thiophene-(poly)siloxane block copolymer according to any one of [4] to [6], wherein the hydrogen acceptor is a hydrocarbon compound having a carbon-carbon unsaturated bond, and having 2 to 20 carbon atoms.

Effects of the Invention

According to the present invention, a (poly)arylene-(poly)siloxane block copolymer can be produced using relatively simple and readily accessible raw materials such as thiophene and a hydrosilyl group-containing organopolysiloxane, and the (poly)arylene-(poly)siloxane block copolymer can be produced at a high conversion rate without producing a metal salt as a by-product.

The (poly)arylene-(poly)siloxane block copolymer of the present invention is a polymer having not only a flexibility owing to (poly)siloxane, but also a heat resistance owing to an aromatic ring. Therefore, the (poly)arylene-(poly)siloxane block copolymer of the present invention is suitable for use in applications such as a heat medium, a mold release agent, a resin modifier and a heat resistant additive.

MODE FOR CARRYING OUT THE INVENTION

The present invention is described in detail hereunder.
[(Poly)Thiophene-(Poly)Siloxane Block Copolymer]
The (poly)thiophene-(poly)siloxane block copolymer of the present invention contains a structure represented by the following formula (1), and is preferably a (poly)thiophene-(poly)siloxane block copolymer represented by the following formula (2).

[Chemical formula 4]

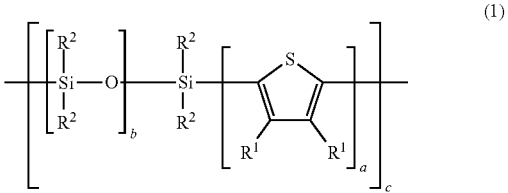

(1)

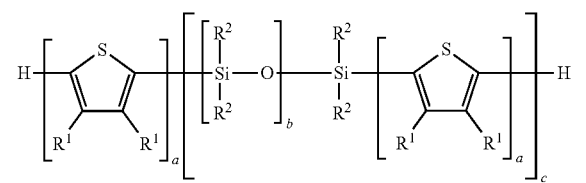

(2)

In the formulae (1) and (2), each $R^1$ independently represents a hydrogen atom, a halogen atom, a hydroxy group, a hydrocarbon group having 1 to 20 carbon atoms, or an alkoxy group having 1 to 10 carbon atoms, where a bond may be formed between two $R^1$s. Examples of the halogen atom include a fluorine atom, a chlorine atom, a bromine atom and an iodine atom. Examples of the hydrocarbon group having 1 to 20 carbon atoms include an alkyl group such as a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group and an eicosyl group; a cycloalkyl group such as a cyclopentyl group and a cyclohexyl group; an aryl group such as a phenyl group and a tolyl group; an alkenyl group such as a vinyl group and an allyl group; and halogenated alkyl groups as well as halogenated alkenyl groups that are obtained by substituting part of or all the carbon atom-bonded hydrogen atoms in the above groups with halogen atoms such as chlorine atoms and fluorine atoms. Examples of the alkoxy group having 1 to 10 carbon atoms include a methoxy group, an ethoxy group, a propoxy group and a butoxy group. As a substituent group forming a bond between two $R^1$s, there may be listed, for example, a group capable of forming 3,4-ethylenedioxythiophene. Among these examples, preferred are a hydrogen atom, a chlorine atom, a bromine atom, an alkyl group having 1 to 12 carbon atoms, an aryl group having 6 to 12 carbon atoms and an alkoxy group having 1 to 3 carbon atoms; more preferred are a hydrogen atom, a chlorine atom, a bromine atom, a methyl group, a hexyl group, a methoxy group, and a group capable of forming 3,4-ethylenedioxythiophene; particularly preferred is a hydrogen atom.

In the formulae (1) and (2), each $R^2$ independently represents a hydrocarbon group having 1 to 20 carbon atoms. Examples of the hydrocarbon group having 1 to 20 carbon atoms include an alkyl group such as a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group and an eicosyl group; a cycloalkyl group such as a cyclopentyl group and a cyclohexyl group; an aryl group such as a phenyl group and a tolyl group; an alkenyl group such as a vinyl group and an allyl group; and halogenated alkyl groups as well as halogenated alkenyl groups that are obtained by substituting part of or all the carbon atom-bonded hydrogen atoms in the above groups with halogen atoms such as chlorine atoms and fluorine atoms. Among these examples, preferred are a methyl group, an ethyl group and a phenyl group; more preferred is a methyl group.

In the formulae (1) and (2), a is a number of 1 to 1,000, preferably 1 to 100, more preferably 1 to 10. In the formulae (1) and (2), b is a number of 2 to 2,000, preferably 4 to 2,000, more preferably 4 to 500. In the formulae (1) and (2), c is a number of 1 to 1,000, preferably 1 to 100, more preferably 1 to 50.

In the present invention, the bonding pattern of the (poly)thiophene-(poly)siloxane units (formulae (1) and (2)) is either linear or cyclic.

[Method for Producing (Poly)Thiophene-(Poly)Siloxane Block Copolymer]

A method for producing the (poly)thiophene-(poly)siloxane block copolymer of the present invention (the method may be abbreviated as "the production method of the present invention" hereunder), includes a step of reacting a "thiophene compound having at least two C—H bonds of an aromatic compound" and a "hydrosilyl group-containing organopolysiloxane" under the presence of an "iridium complex" and a "hydrogen acceptor."

The inventor of the present invention diligently conducted a series of studies to seek an environment-friendly and efficient method for producing a (poly)thiophene-(poly) siloxane block copolymer. As a result, the inventor found that a (poly)thiophene-(poly)siloxane block copolymer can be directly and efficiently synthesized via an oxidative coupling reaction between a thiophene compound and a hydrosilyl group-containing organopolysiloxane with the aid of an iridium complex and a hydrogen acceptor. For example, a chemical reaction formula can be expressed as follows, when thiophene is used as the "thiophene compound having at least two C—H bonds of an aromatic compound," and a compound represented by the following average formula (5) is used as the "hydrosilyl group-containing organopolysiloxane." n is a number of 1 to 1,000, preferably a number of 1 to 100.

[Chemical formula 5]

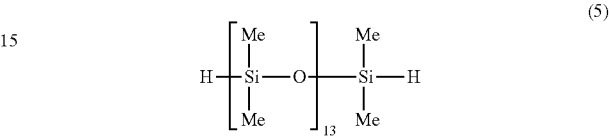

(5)

[Chemical formula 6]

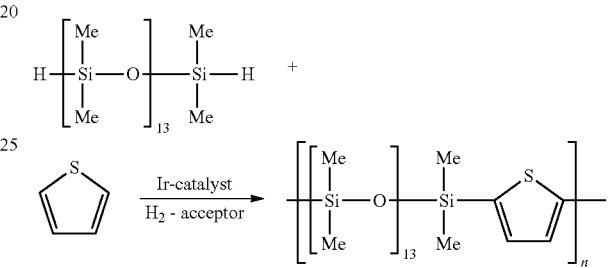

The production method of the present invention is an environment-friendly and efficient production method as the method employs relatively simple and readily accessible raw materials such as thiophene and a hydrosilyl group-containing organopolysiloxane, and is capable of producing a (poly)thiophene-(poly)siloxane block copolymer at a high conversion rate without producing a metal salt as a by-product.

(Thiophene Compound Having at Least Two C—H Bonds of Aromatic Compound)

The production method of the present invention is characterized by reacting the thiophene compound having at least two C—H bonds of an aromatic compound (the compound may be abbreviated as "thiophene compound" hereunder) with the hydrosilyl group-containing organopolysiloxane. There are no particular restrictions on the type of the thiophene compound; the thiophene compound may be appropriately selected depending on the (poly)thiophene-(poly)siloxane block copolymer to be produced. Basically, there is selected a thiophene compound having a structure identical to that of an aromatic ring moiety of the (poly)thiophene-(poly)siloxane block copolymer to be produced; specific examples of such thiophene compound include substituted or unsubstituted thiophenes. Here, it is preferred that a substituent group have a moiety identical to $R^1$ in the (poly)thiophene-(poly)siloxane block copolymer to be produced. $R^1$ may for example be a hydrogen atom, a halogen atom, a hydroxy group, a hydrocarbon group having 1 to 20 carbon atoms, or an alkoxy group having 1 to 10 carbon atoms, where a bond may be formed between two $R^1$s. Examples of the halogen atom include a fluorine atom, a chlorine atom, a bromine atom and an iodine atom. Examples of the hydrocarbon group having 1 to 20 carbon atoms include an alkyl group such as a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group and an eicosyl group; a cycloalkyl group such as a cyclopentyl group and a cyclohexyl group; an aryl group such as a phenyl group and a tolyl group; an alkenyl group such as a vinyl group and an allyl group; and halogenated alkyl groups as well as halogenated alkenyl groups that are obtained by substituting part of or all the carbon atom-bonded hydrogen atoms in the above groups with halogen atoms such as chlorine atoms and fluorine atoms. Examples of the alkoxy group having 1 to 10 carbon atoms include a methoxy group, an ethoxy group, a propoxy group and a butoxy group. As a substituent group forming a bond between two $R^1$s, there may be listed, for example, a 3,4-ethylenedioxy group.

As a preferable thiophene compound used in the present invention, there may be listed, for example, thiophene, 2,2'-bithiophene and α-terthiophene.

(Hydrosilyl Group-Containing Organopolysiloxane)

The production method of the present invention is characterized by reacting the thiophene compound with the hydrosilyl group-containing organopolysiloxane. There are no particular restrictions on the type of the hydrosilyl group-containing organopolysiloxane; the hydrosilyl group-containing organopolysiloxane may be appropriately selected depending on the (poly)thiophene-(poly)siloxane block copolymer to be produced. Basically, there is selected a hydrosilyl group-containing organopolysiloxane having a structure identical to that of the siloxane (—$R^2{}_2$SiO—) moiety of the (poly)thiophene-(poly)siloxane block copolymer to be produced.

Here, each $R^2$ in the siloxane (—$R^2{}_2$SiO—) of the (poly)thiophene-(poly)siloxane block copolymer to be produced by the present invention, independently represents a hydrocarbon group having 1 to 20 carbon atoms. Examples of the hydrocarbon group having 1 to 20 carbon atoms include an alkyl group such as a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group and an eicosyl group; a cycloalkyl group such as a cyclopentyl group and a cyclohexyl group; an aryl group such as a phenyl group and a tolyl group; an alkenyl group such as a vinyl group and an allyl group; and halogenated alkyl groups as well as halogenated alkenyl groups that are obtained by substituting part of or all the carbon atom-bonded hydrogen atoms in the above groups with halogen atoms such as chlorine atoms and fluorine atoms.

(Iridium Complex)

The production method of the present invention is characterized by being performed under the presence of an iridium complex. There are no particular restrictions on the type of the iridium complex; a known iridium complex may be appropriately used. As a ligand to be coordinated to a iridium atom, there may be listed, for example, an aromatic hydrocarbon compound having a structure of benzene, naphthalene or the like; a hetero ring compound having a structure of thiophene, pyridine, pyrazine, pyrimidine, pyridazine, triazine, phenanthroline, thiazole, oxazole, pyrrole, imidazole, pyrazole, triazole or the like; a hydrocarbon compound having a nitrogen-containing functional group such as an alkylamino group, an arylamino group, an acylamino group, an alkoxycarbonylamino group, an aryloxycarbonylamino group, a sulfonylamino group and an imino group; a hydrocarbon compound having an oxygen-containing functional group such as an alkoxy group, an aryloxy group, an acyloxy group, a siloxy group, a carbonyl group and an ether group; a hydrocarbon compound having a sulfur-containing functional group such as an alkylthio group, an arylthio group and a thioether group; and a hydrocarbon compound having a phosphorus-containing functional group such as a dialkylphosphino group, a diarylphosphino group, trialkylphosphine, triarylphosphine and a phosphine group.

The ligand of the iridium complex in the production method of the present invention is at least one compound selected from the group consisting of an aromatic hydrocarbon compound having 6 to 30, preferably 6 to 26, more preferably 10 to 24 carbon atoms; a hetero ring compound having 2 to 30, preferably 2 to 16 carbon atoms; a hydrocarbon compound having a nitrogen-containing functional group, and having 1 to 30, preferably 3 to 16 carbon atoms; a hydrocarbon compound having an oxygen-containing functional group, and having 1 to 30, preferably 3 to 16 carbon atoms; a hydrocarbon compound having a sulfur-containing functional group, and having 1 to 30, preferably 3 to 20 carbon atoms; and a hydrocarbon compound having a phosphorus-containing functional group, and having 1 to 30, preferably 3 to 27 carbon atoms. Among these ligands, preferred is a hetero ring compound having 2 to 30 carbon atoms, or a hydrocarbon compound having a phosphorus-containing functional group and 1 to 30 carbon atoms; specifically, more preferred are 2-methyl-1,10-phenanthroline, 4,4'-di-tert-butylbipyridine (dtbpy), 2,2'-bipyridyl and 1,3-bis(diphenylphosphino)propane (dppp).

There are no particular restrictions on an amount (mass) of the iridium complex used in the production method of the present invention, and the amount may be appropriately selected depending on an intended purpose; it is preferred that the iridium complex be used in an amount of 100 to 20,000 ppm, more preferably 300 to 15,000 ppm, most preferably 500 to 10,000 ppm, with respect to the amount (mass) of the hydrosilyl group-containing organopolysiloxane used. When the amount of the iridium complex used is within the above ranges, the reaction can progress in an efficient manner.

In the production method of the present invention, there are no particular restrictions on a method for preparing the iridium complex. Other than a method where the iridium complex is prepared by separately reacting a precursor containing iridium (the precursor may be abbreviated as "iridium-containing precursor" hereunder) with the ligand, the iridium complex may also be prepared by a method where the iridium-containing precursor and the ligand are to be put into a reaction container for reacting the thiophene compound and the hydrosilyl group-containing organopolysiloxane, whereby the iridium complex is then formed in such reaction container. In terms of ease of operation, it is preferred that the iridium complex be formed in the reaction container for reacting the thiophene compound and the hydrosilyl group-containing organopolysiloxane. Here, there are no particular restrictions on the type of the iridium-containing precursor; a commercially available and known iridium-containing precursor may be appropriately utilized. Specifically, there may be listed, for example, [Ir (OMe) (cod)]$_2$, [Ir (OH) (cod)]$_2$, [IrCl (cod)]$_2$, and [Ir (OAc) (cod)]$_2$ (in these formulae, cod represents 1,5-cyclooctadiene). Further, it is preferred that the amount (amount of substance [mol]) of the ligand used when preparing the iridium complex be 1 to 25 times larger, more preferably 5 to 20 times larger, most preferably 10 to 15 times larger than the amount (amount of substance [mol]) of the iridium-containing precursor used.

(Hydrogen Acceptor)

The production method of the present invention is characterized by being performed under the presence of a hydrogen acceptor. There are no particular restrictions on the type of the hydrogen acceptor, so long as it is a substance capable of taking in two or more hydrogen atoms (H) by a chemical reaction. As a specific hydrogen acceptor, there may be listed, for example, a carbon-carbon unsaturated bond-containing hydrocarbon compound that is capable of taking in hydrogen atoms (H) by an addition reaction, and has 2 to 20, preferably 2 to 10 carbon atoms. As a specific example of the hydrocarbon compound having a carbon-carbon unsaturated bond, there may be listed, for example, cyclohexene, norbomene, t-butylalkene, 1-octene, trans-stilbene, 1,5-cyclooctadiene, phenylacetylene and diphenylacetylene; it is preferred that one or more kinds of these hydrocarbon compounds be used.

There are no particular restrictions on an amount (amount of substance [mol]) of the hydrogen acceptor used in the production method of the present invention, and the amount may be appropriately selected depending on an intended purpose. It is preferred that the amount (amount of substance [mol]) of the hydrogen acceptor used be 1 to 30 times larger, more preferably 2 to 7 times larger, most preferably 3 to 6 times larger than the amount (amount of substance [mol]) of the hydrosilyl group-containing organopolysiloxane used. When the amount of the hydrogen acceptor used is within the above ranges, the reaction can progress in an efficient manner.

(Reaction Condition)

The production method of the present invention is characterized by reacting the thiophene compound with the hydrosilyl group-containing organopolysiloxane. In the production method of the present invention, there are no particular restrictions on reaction conditions such as a reaction temperature, a reaction time, and a solvent used.

The reaction temperature is preferably 25 to 200° C., more preferably 70 to 150° C., and most preferably 100 to 110° C. When the reaction temperature is within the above ranges, the (poly)thiophene-(poly)siloxane block copolymer can be produced at a high conversion rate.

The reaction time is preferably 1 to 60 hours, more preferably 2 to 48 hours, and most preferably 10 to 24 hours.

While a solvent may or may not be used, it is preferred that there be used a solvent if both the thiophene compound and the hydrosilyl group-containing organopolysiloxane are solid at the reaction temperature. There are no particular restrictions on the solvent used so long as it is capable of dissolving both the thiophene compound and the hydrosilyl group-containing organopolysiloxane; specific examples of such solvent include tetrahydrofuran, decane and octane.

Working Examples

The present invention is described in greater detail hereunder with reference to working examples; the invention may be appropriately modified without departing from the gist of the present invention. Thus, the scope of the present invention shall not be interpreted in a limited manner by the specific examples shown below.

$^1$H-NMR measurement described in the working examples was carried out with AVANCE-III 400 MHz (by BRUKER Corporation), using heavy chloroform as a solvent. Values shown in the brackets are integral ratios.

Further, a weight-average molecular weight is a value measured by a GPC (gel permeation chromatography) analysis conducted under the following conditions, where polystyrene was used as a reference substance.

[Measurement Conditions]
 Developing solvent: Tetrahydrofran (THF)
 Flow rate: 0.6 mL/min
 Detector: Refractive index detector (RI)
 Column: TSK Guardcolumn Super H—H
  TSK gel SuperHM-N (6.0 mmI.D.×15 cm×1)
  TSK gel SuperH2500 (6.0 mmI.D.×15 cm×1)
 (All manufactured by TOSOH CORPORATION)
 Column temperature: 40° C.
 Sample injection volume: 50 μL (THF solution having a concentration of 0.3% by weight)

Here, in the structural formulae shown in the following working examples, Me represents a methyl group, and hexyl represents a n-hexyl group.

Working Example 1

Here, 61.3 mg of 2-methyl-1,10-phenanthroline, 7.30 g of thiophene, 12.96 g of cyclohexene, 1.05 g of tetrahydrofuran and 81.25 g of an organopolysiloxane that is represented by the average formula (5) shown below and contains hydrosilyl groups at both ends thereof, were put into a 200 mL separable flask equipped with a thermometer, a stirrer, a reflux condenser and a nitrogen gas introduction tube, followed by delivering 104.6 mg of [Ir (OMe) (cod)]$_2$ thereinto under a nitrogen atmosphere and at a temperature of 25° C. while performing stirring, and then carrying out heating and refluxing at 100° C. for 9 hours. After confirming via $^1$H-NMR that a conversion rate of the organopolysiloxane containing hydrosilyl groups at both ends thereof was 98% or higher, low-boiling-point substances were distilled away under a reduced pressure and at an inner temperature of 80° C., followed by adding 30 g of silica gel 60N (by KANTO CHEMICAL CO., INC.) into the separable flask to then perform stirring. By carrying out filtration under an increased pressure, a brown and transparent liquid was obtained. A yield was 80.28 g. The weight-average molecular weight was 50,400. It was confirmed via $^1$H-NMR that there was obtained a compound represented by the flowing average formula (6).

[Chemical formula 7]

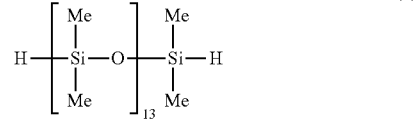

(5)

[Chemical formula 8]

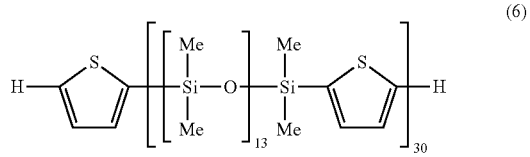

(6)

The $^1$H-NMR data of the compound represented by the average formula (6) are as follows.

0.07 ppm (2160H), 0.40 ppm (360H), 7.17 ppm (2H), 7.26 ppm (29H), 7.31 ppm (2H), 7.35 ppm (29H), 7.59 ppm (2H)

Working Example 2

Here, 16.9 mg of 2-methyl-1,10-phenanthroline, 1.99 g of 2,2'-bithiophene, 1.79 g of cyclohexene, 0.29 g of tetrahydrofuran and 12.52 g of an organopolysiloxane that is represented by the average formula (5) shown below and contains hydrosilyl groups at both ends thereof, were put into a 50 mL separable flask equipped with a thermometer, a stirrer, a reflux condenser and a nitrogen gas introduction tube, followed by delivering 28.9 mg of [Ir (OMe) (cod)]$_2$ thereinto under a nitrogen atmosphere and at a temperature of 25° C. while performing stirring, and then carrying out heating and refluxing at 100° C. for 5 hours. After confirming via $^1$H-NMR that a conversion rate of the organopolysiloxane containing hydrosilyl groups at both ends thereof was 98% or higher, low-boiling-point substances were distilled away under a reduced pressure and at an inner temperature of 80° C., followed by adding 10 g of silica gel 60N (by KANTO CHEMICAL CO., INC.) into the separable flask to then perform stirring. By carrying out filtration under an increased pressure, a brown and transparent liquid was obtained. A yield was 8.42 g. The weight-average molecular weight was 30,300. It was confirmed via $^1$H-NMR that there was obtained a compound represented by the flowing average formula (7).

[Chemical formula 9]

[Chemical formula 10]

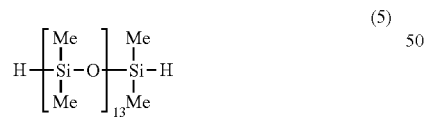

The $^1$H-NMR data of the compound represented by the average formula (7) are as follows.

0.07 ppm (792H), 0.41 ppm (132H), 7.01 ppm (2H), 7.19 ppm (24H), 7.24 ppm (24H)

Working Example 3

Here, 19.5 mg of 2-methyl-1,10-phenanthroline, 3.43 g of α-terthiophene, 2.06 g of cyclohexene, 0.33 g of tetrahydrofuran and 14.43 g of an organopolysiloxane that is represented by the average formula (5) shown below and contains hydrosilyl groups at both ends thereof, were put into a 50 mL separable flask equipped with a thermometer, a stirrer, a reflux condenser and a nitrogen gas introduction tube, followed by delivering 33.3 mg of [Ir (OMe) (cod)]2 thereinto under a nitrogen atmosphere and at a temperature of 25° C. while performing stirring, and then carrying out heating and refluxing at 100° C. for 5 hours. After confirming via $^1$H-NMR that a conversion rate of the organopolysiloxane containing hydrosilyl groups at both ends thereof was 98% or higher, low-boiling-point substances were distilled away under a reduced pressure and at an inner temperature of 80° C., followed by adding 10 g of silica gel 60N (by KANTO CHEMICAL CO., INC.) into the separable flask to then perform stirring. By carrying out filtration under an increased pressure, a brown and transparent liquid was obtained. A yield was 10.0 g. The weight-average molecular weight was 46,900. It was confirmed via $^1$H-NMR that there was obtained a compound represented by the flowing average formula (8).

[Chemical formula 11]

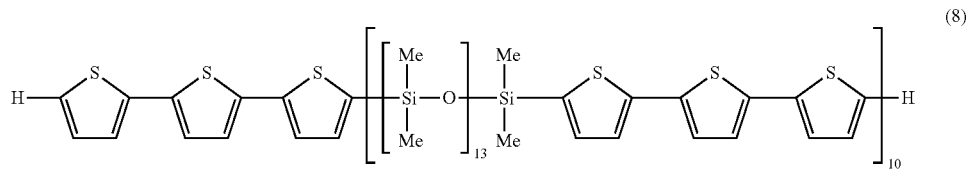

[Chemical formula 12]

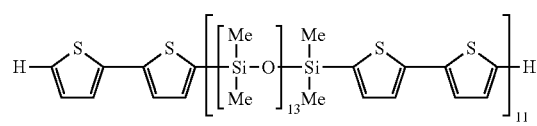

The $^1$H-NMR data of the compound represented by the average formula (8) are as follows.

0.09 ppm (720H), 0.42 ppm (120H), 7.02 ppm (2H), 7.10 ppm (22H), 7.19 ppm (22H), 7.22 ppm (22H)

Working Example 4

Here, 1.15 mg of 2-methyl-1,10-phenanthroline, 1.84 g of poly(3-hexylthiophene-2,5-diyl) (regioregular) (by Sigma-Aldrich Co. LLC, Mw: 18,400), 0.0164 g of cyclohexene, 10 g of tetrahydrofiran and 0.103 g of an organopolysiloxane that is represented by the average formula (5) shown below and contains hydrosilyl groups at both ends thereof, were put into a 50 mL separable flask equipped with a thermometer, a stirrer, a reflux condenser and a nitrogen gas introduction tube, followed by delivering 2.0 mg of [Ir (OMe) (cod)]$_2$ thereinto under a nitrogen atmosphere and at a temperature of 25° C. while performing stirring, and then carrying out heating and refluxing at 100° C. for 6 hours. After confirming via $^1$H-NMR that a conversion rate of the organopolysiloxane containing hydrosilyl groups at both ends thereof was 98% or higher, low-boiling-point substances were distilled away under a reduced pressure and at an inner temperature of 80° C. to obtain a blackish green solid. The weight-average molecular weight was 29,500. It was confirmed via ¹H-NMR that there was obtained a compound represented by the flowing average formula (9).

[Chemical formula 13]

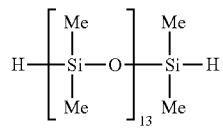
(5)

[Chemical formula 14]

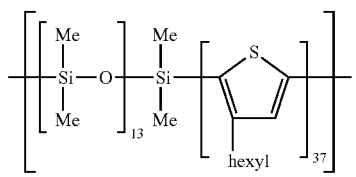
(9)

The ¹H-NMR data of the compound represented by the average formula (9) are as follows.

0.00 ppm (84H), 0.80 ppm (111H), 1.20 to 1.40 ppm (296H), 3.70 ppm (74H), 6.90 ppm (37H)

The invention claimed is:

1. A (poly)thiophene-(poly)siloxane block copolymer containing a structure represented by the following formula (1):

[Chemical formula 1]

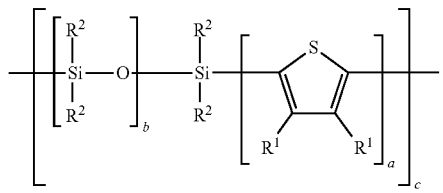
(1)

wherein each $R^1$ independently represents a hydrogen atom, a halogen atom, a hydroxy group, a hydrocarbon group having 1 to 20 carbon atoms, or an alkoxy group having 1 to 10 carbon atoms, and a bond may be formed between two $R^1$s; each $R^2$ independently represents a hydrocarbon group having 1 to 20 carbon atoms; a is a number of 1 to 1,000; b is a number of 2 to 2,000; c is a number of 1 to 1,000.

2. The (poly)thiophene-(poly)siloxane block copolymer according to claim 1, wherein the (poly)thiophene-(poly)siloxane block copolymer is represented by the following formula (2):

[Chemical formula 2]

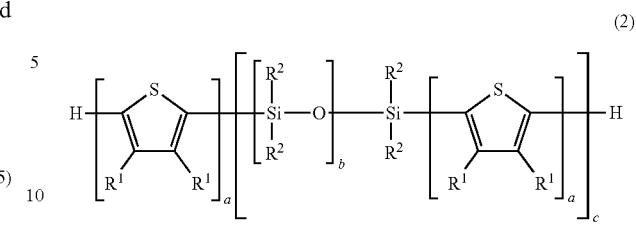
(2)

wherein each $R^1$ independently represents a hydrogen atom, a halogen atom, a hydroxy group, a hydrocarbon group having 1 to 20 carbon atoms, or an alkoxy group having 1 to 10 carbon atoms, and a bond may be formed between two R's; each $R^2$ independently represents a hydrocarbon group having 1 to 20 carbon atoms; each a is independently a number of 1 to 1,000; b is a number of 2 to 2,000; c is a number of 1 to 1,000.

3. The (poly)thiophene-(poly)siloxane block copolymer according to claim 1, wherein each $R^1$ independently represents a hydrogen atom, a chlorine atom, a bromine atom, an alkyl group having 1 to 12 carbon atoms, an aryl group having 6 to 12 carbon atoms, or an alkoxy group having 1 to 3 carbon atoms, and a bond may be formed between two $R^1$s.

4. A method for producing the (poly)thiophene-(poly) siloxane block copolymer according to claim 1, comprising a step of reacting
(A) a thiophene compound represented by the following formula (3) and
(B) a hydrosilyl group-containing organopolysiloxane represented by the following formula (4) under the presence of an iridium complex and a hydrogen acceptor,

[Chemical formulae 3]

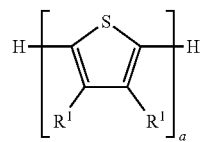
(3)

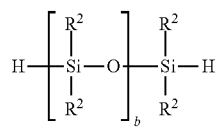
(4)

wherein each $R^1$ independently represents a hydrogen atom, a halogen atom, a hydroxy group, a hydrocarbon group having 1 to 20 carbon atoms, or an alkoxy group having 1 to 10 carbon atoms, and a bond may be formed between two $R^1$s; each $R^2$ independently represents a hydrocarbon group having 1 to 20 carbon atoms; a is a number of 1 to 1,000; b is a number of 2 to 2,000.

5. The method for producing the (poly)thiophene-(poly) siloxane block copolymer according to claim 4, wherein the iridium complex is a complex whose ligand is at least one compound selected from the group consisting of an aromatic hydrocarbon compound having 6 to 30 carbon atoms; a hetero ring compound having 2 to 30 carbon atoms; a hydrocarbon compound having a nitrogen-containing functional group, and having 1 to 30 carbon atoms; a hydrocarbon compound having an oxygen-containing functional group, and having 1 to 30 carbon atoms; a hydrocarbon compound having a sulfur-containing functional group, and having 1 to 30 carbon atoms; and a hydrocarbon compound having a phosphorus-containing functional group, and having 1 to 30 carbon atoms.

6. The method for producing the (poly)thiophene-(poly)siloxane block copolymer according to claim 5, wherein the iridium complex is a complex whose ligand is a hetero ring compound having 2 to 30 carbon atoms; or a hydrocarbon compound having a phosphorus-containing functional group, and having 1 to 30 carbon atoms.

7. The method for producing the (poly)thiophene-(poly)siloxane block copolymer according to claim 4, wherein the hydrogen acceptor is a hydrocarbon compound having a carbon-carbon unsaturated bond, and having 2 to 20 carbon atoms.

* * * * *